United States Patent [19]

Voigt et al.

[11] 4,066,495

[45] Jan. 3, 1978

[54] METHOD OF MAKING PAPER CONTAINING CATIONIC STARCH AND AN ANIONIC RETENTION AID

[75] Inventors: John E. Voigt, St. Louis County; Herbert Pender, Jr., Ferguson, both of Mo.

[73] Assignee: Anheuser-Busch, Incorporated, St. Louis, Mo.

[21] Appl. No.: 483,315

[22] Filed: June 26, 1974

[51] Int. Cl.$^2$ .......................... C08L 3/02; D21D 3/00; D21D 3/58; D21H 3/00
[52] U.S. Cl. ............................ 162/168 NA; 162/162; 162/175; 260/17.4 ST
[58] Field of Search ...................... 260/17.4 ST, 233.3; 162/162, 175, 168 NA

[56] References Cited

U.S. PATENT DOCUMENTS 3,378,547  4/1968  Patel et al. .................... 260/233.3

FOREIGN PATENT DOCUMENTS 657,187  2/1963  Canada ......................... 162/168 NA

OTHER PUBLICATIONS

Chem. Abst. 73:67829c, (1970), "Retention Agents, Influence on Paper Characteristics", Vallette et al.
Chem. Absts. 73:67830w, "Cationic ... Papermaking", Ansart.

*Primary Examiner* — Edward M. Woodberry
*Attorney, Agent, or Firm* — Gravely, Lieder & Woodruff

[57] ABSTRACT

This application covers the use of a cationic starch and a polyacrylamide polymer as a retention aid in the manufacture of paper. The resulting paper containing the additives is characterized by improved retention of pigments.

2 Claims, No Drawings

METHOD OF MAKING PAPER CONTAINING CATIONIC STARCH AND AN ANIONIC RETENTION AID

BACKGROUND OF THE INVENTION

Our invention relates to a method for the manufacture of paper and to the improved paper thus obtained. More specifically, it is an object of this invention to provide an additive which may be incorporated with the stock during the manufacture of paper, thereby causing the paper to have improved retention of pigments and other desirable properties.

Our invention comprises the addition of anionic polyacrylamide polymer groups and starch derivatives containing cationic substituent groups to paper stock or pulp.

Paper that is thinner and lighter in weight is increasingly in demand to reduce the weight of printed material that must be shipped and mailed. Fillers or pigments are added in the stock during the papermaking process, prior to the formation of the sheet, to impart opacity to the finished sheet. Some of the pigments used have a mineral source, particularly clays, calcium carbonate, talc, titanium dioxide, gypsum, and zinc pigments. In addition to their ability to enhance opacity, the pigments improve brightness, printability and smoothness.

Since conventional pigments do not have an affinity for the cellulose fibers of paper, a binder for the pigment is incorporated into the paper. Conventionally, starch has been incorporated into paper to strengthen the paper. However, the starch employed for binding and strenthening the paper does not improve the pigment retention, and in many cases actually decreases the amount of pigment retained by the paper.

The addition of the non-fibrous fillers or pigments in substantial proportion makes the paper web weaker both in wet strength during its formation and in dry strength. Of course, larger amounts of starch could be added to increase the strength of the bond of the paper but this also increases the weight.

Several derivatives of starch have been introduced in recent years which are designed to increase the retention of fillers in paper and at the same time to improve the structural properties of the paper. (U.S. Pat. Nos. 2,935,436; 2,813,093; 3,017,294; 3,151,019).

We have now discovered that the addition of a novel starch derivative, hereinafter described, to the pulp in the headbox of the Fourdrinier paper manufacturing machine results in a remarkable improvement in pigment retention in the paper, together with a concomitant increase in paper strength.

SUMMARY OF THE INVENTION

The novel additives used in our invention are starch derivatives which contain cationic groups in combination with a material which contains controlled amounts of anionic polyacrylamide polymer groups.

DETAILED DESCRIPTION

Our process may employ any starch derivative which contains the cationic (i.e., electrically positively charged) moiety shown below. The preferred cationic starch is made according to the process described in Hunt U.S. Pat. No. 3,624,070 issued Nov. 30, 1971.

This product is the reaction product of starch and an amine butene halide salt, which term includes quaternary ammonium alkene halide salts.

The product has the following structural formula:

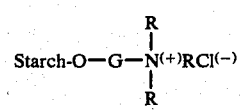

where R is methyl or ethyl and G is alkenylene of 1 to 4 carbons.

The preferred reactant is 1-chloro-4-butenyltrimethylammonium chloride.

As stated, the starch derivatives, to be suitable as an additive to paper pulp in the process of our invention, are used in combination with a controlled amount of anionic polyacrylamide polymer groups. From about 5 ppm to about 250 ppm polyacrylamide polymer based on the weight of dry pulp is added to the pulp.

Also, starch derivatives suitable for use in the process of this invention should be substituted with cationic groups to such an extent that their degree of substitution (D.S.), i.e., the average number of cationic groups per anhydroglucose unit of the starch molecule, ranges from about 0.0034 to 0.07, preferably about 0.035.

The starch derivatives suitable for the process of this invention are in the form of intact granules. They may be derived from any plant source including corn, rice, potato, wheat, tapioca and the like. They may also be derived from any of the conversion products of these starch types prepared by enzyme conversion or acid hydrolysis. The starting starch should have a fluidity of about 5 to about 50, preferably about 12.

The starch is reacted with about 0.45 to about 10 percent by weight of a cationic reactant at a temperature of about 80° F. to about 130° F. for a period of about 7 to about 48 hours. The starch reaction product is recovered and has about 0.0034 to about 0.07 degrees of substitution and a fluidity of about 5 to about 50.

In the papermaking process, the starch derivative is cooked with water to paste the same before being used in the papermaking process. The polyacrylamide polymer can be added to the starch before or after pasting and when the starch is added to the papermaking process it is on a cooked starch basis. Also, the polyacrylamide can be mixed dry with the cationic starch by the starch manufacturer and sold as a mixture to the papermaker. Alternatively, the starch and polyacrylamide can be added separately at the paper manufacturing plant.

The cooked starch derivatives are used mainly as headbox additives. This is the initial point in the papermaking process where the water temperature normally is in the range of about 60° to 90° F., and the pH normally is in a range of about 4 to about 8.0.

The amount of the starch derivative to be incorporated with the paper pulp may vary from 0.015% to about 5% in accordance with the particular pulp involved. In general, we prefer to use about 0.1% to about 5%, usually about 1%, of the starch derivative, based on the dry weight of the pulp. Within this range the precise amount which is used will depend upon the type of pulp being used, the specific operating conditions, and the particular end-use for which the paper is intended. As mentioned, the starch is cooked before it is added to the pulp. It can be added in the headbox or earlier in the process of papermaking if desired.

The amount of retention aid or anionic polyacrylamide polymer used may be from about 0.5% to about 5%, preferably about 2%, based on the dry weight of the starch. The amount of retention aid used varies depending upon the type of pulp, starch or filler being used.

The products of this invention yield improved performances in terms of pigment retention and paper strength.

HANDSHEET PREPARATION METHODS

A. TAPPI Method T205 M-47

In the laboratory the evaluation of retention aids, etc. is made by fabricating handsheets which are circular paper mats of 25 cms. diameter. The method used is TAPPI Method T205 M-47 which includes the following steps:
1. Assembling the required furnish.
2. Forming handsheets.
3. Observing sheet characteristics.

A mineral filler, titanium dioxide, was included in the furnish in the amount of 10% by weight of the pulp.

Using this process, handsheets in which cationic starch was used as a retention aid had 31% of the titanium dioxide retained measured as "ash". When 2% (based on starch weight) of the polyacrylamide polymer retention aid was added with the same amount of cationic starch, the retention was increased to 41%.

B. Anheuser-Busch Modification of TAPPI Method

In certain of the tests and data presented hereinafter, handsheets were made by a modified TAPPI method. In our modification, 10% titanium dioxide, 3% alum, 2% rosin, and 1% starch was used. The amounts of additives are based on the total weight of the furnish or pulp. In other respects the TAPPI procedure was followed.

The presence of alum precipitates rosin on the cellulose fibers. The alum also aids in obtaining the benefits of the anionic polyacrylamide.

Example No. 1 is a method of making cationic starch:

EXAMPLE NO. 1

37.8 grams of a 50% solution of 1-chloro-4-butenyl-trimethylammonium chloride prepared according to the process of U.S. Pat. No. 3,624,070 is added to 1000 grams of a starch slurry containing 420 grams of dent starch of 40 fluidity and 8 grams hydrated lime. The solution is allowed to react for 18 hours with starch at 52° C. The slurry is then adjusted to pH 3.0 with dilute hydrochloric acid (1 part 37% hydrochloric acid diluted with 4 parts water). The slurry is diluted to 13° Be., filtered, washed with 300 ml. water on the filter, and dried. The cationic starch had a degree of substitution of 0.033 and is used in the examples hereinafter set forth.

The effect of the cationic starch and anionic polyacrylamide polymer groups in increasing the retention of pigment is further illustrated in the following examples.

EXAMPLE NO. 2

Example No. 2 illustrates the preparation of a material at the starch plant which contains cationic starch and anionic polyacrylamide polymer, and which is suitable for use in the process of this invention.

A cationic starch is prepared using the procedure of Example No. 1. The starch has a degree of substitution of 0.033. 98% of the cationic starch material is mixed with 2% by weight polyacrylamide polymer of about 5 $\times$ 10$^6$ average molecular weight.

EXAMPLE NO. 3

The product of Example No. 2 is added to water and cooked with steam for 20 minutes at 195° F. to gelatinize the starch. The cooked starch material is added to the headbox of a paper process as a wet-end additive in an amount of 1% by weight based on the weight of wood pulp solids. This means that 0.98% starch and 0.02% polyacrylamide polymer is added. The headbox has a concentration of about 0.3% to 0.7%, preferably about 0.5% by weight wood pulp.

EXAMPLE NO. 4

Table No. I illustrates the improved pigment retention resulting from the addition of cationic starch and polyacrylamide polymer to papermaking pulp, compared to the addition of cationic starch alone. The handsheets were prepared according to previously described method B using rosin and alum. The cationic starch was added at 1% by weight based on the dry pulp weight and the polyacrylamide was added at 2% by weight based on the dry starch weight. The cationic starch has a degree of substitution of 0.033 and is prepared according to the process of Example No. 1.

TABLE No. I

| | Preparative Data and Retention (ashing) | | | | | |
|---|---|---|---|---|---|---|
| Sample | Handsheet | Temp. (° F.) | pH | Drainage Time (sec.) | Handsheet Wt. (g.) | Ash % Composite (as is) |
| CATIONIC STARCH | 1 | 80 | 4.05 | 5.0 | 1.514 | 3.1 |
| | 2 | 78 | 4.00 | 5.0 | 1.616 | 3.1 |
| | 3 | 78 | 4.30 | 5.0 | 1.625 | 3.1 |
| | 4 | 82 | 4.50 | 5.3 | 1.647 | 3.1 |
| | 5 | 82 | 4.75 | 5.0 | 1.647 | 3.1 |
| | 6 | 79 | 5.00 | 5.0 | 1.655 | 3.1 |
| | 7 | 77 | 4.20 | 5.2 | 1.716 | 3.1 |
| CATIONIC STARCH + POLYACRYLAMIDE (Anionic) | 1 | 78 | 4.00 | 5.0 | 1.290 | 4.1 |
| | 2 | 78 | 4.60 | 5.2 | 1.332 | 4.1 |
| | 3 | 78 | 4.50 | 5.0 | 1.336 | 4.1 |
| | 4 | 77 | 4.50 | 5.0 | 1.329 | 4.1 |
| | 5 | 76 | 4.25 | 5.0 | 1.331 | 4.1 |
| | 6 | 78 | 4.80 | 5.0 | 1.336 | 4.1 |
| | 7 | 76 | 4.80 | 5.0 | 1.380 | 4.1 |

In the foregoing examples, the pH is maintained between 4 to 5 by the addition of alum and/or sulfuric acid.

In making filled paper, it is necessary to maintain a sufficient concentration of filler in the headbox to assure that the web retains the desired amount of pigment. If the retention of fines in the paper web is high usually this decreases the rate of drainage from the wire, and in general, impedes product formation. This is the reason for listing the drainage time. The drainage times of this invention are at least equal to or better than those for cationic starches alone. The ash is measured by techniques known in the art.

Table No. II is prepared using the techniques and amounts of ingredients as used in Table No. I, and shows the comparative results of handsheets prepared with no additives and those made according to the present invention. The starches of this invention were prepared according to the process hereinbefore set out and the additives are at the same levels. The starch used in the blank is unmodified and the retention aid is anionic polyacrylamide polymer of about similar molecular weight.

All the starch is 1% by weight of the furnish or pulp and the retention aid is 2% by weight of the starch.

What is claimed is:

1. A method of papermaking comprising the steps of adding from about 0.015% to about 4% by weight based on the weight of dry pulp of a cationic starch having a degree of substitution of about 0.0034 to about 0.07 and consisting essentially of the reaction product of starch and an amine alkene halide salt and from about 5 ppm to about 250 ppm based on dry pulp of an anionic polyacrylamide polymer to the pulp in a papermaking process prior to depositing the pulp on a screen, said polymer having an average molecular weight of about $4 \times 10^6$ to about $6 \times 10^6$.

2. The method of claim 1 wherein the cationic starch is 1-chloro-4-butenyltrimethylammonium chloride.

* * * * *

TABLE No. II

| Sample | Handsheet | Temp. (° F.) | pH | Drainage Time (sec.) | Handsheet Wt. (g.) | Ash % Composite (as is) |
|---|---|---|---|---|---|---|
| BLANK | 1 | 79 | 4.10 | 5.0 | 1.351 | 3.1 |
| NO | 2 | 78 | 4.20 | 5.1 | 1.333 | 3.1 |
| STARCH | 3 | 78 | 4.60 | 5.1 | 1.361 | 3.1 |
| OR AID | 4 | 78 | 4.10 | 5.4 | 1.434 | 3.1 |
|  | 5 | 78 | 4.50 | 5.0 | 1.420 | 3.1 |
|  | 6 | 79 | 4.65 | 5.0 | 1.418 | 3.1 |
|  | 7 | 76 | 4.10 | 4.8 | 1.130 | 3.1 |
| CATIONIC | 1 | 79 | 4.45 | 5.4 | 1.563 | 3.7 |
| STARCH | 2 | 78 | 4.00 | 5.0 | 1.518 | 3.7 |
| + | 3 | 78 | 4.30 | 5.2 | 1.505 | 3.7 |
| RETENTION | 4 | 76 | 4.90 | 5.5 | 1.590 | 3.7 |
| AID | 5 | 77 | 4.35 | 5.0 | 1.586 | 3.7 |
|  | 6 | 77 | 4.30 | 5.4 | 1.574 | 3.7 |
| (Anionic) | 7 | 76 | 4.10 | 5.6 | 1.598 | 3.7 |